April 2, 1957  S. L. YOUNG  2,787,006
FRICTION HINGE
Filed July 20, 1953
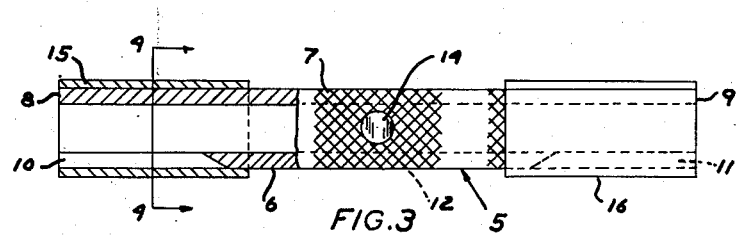
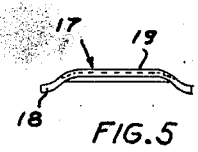
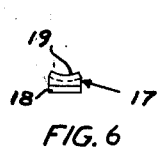
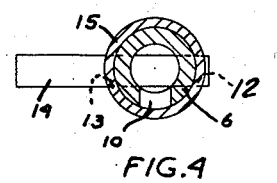
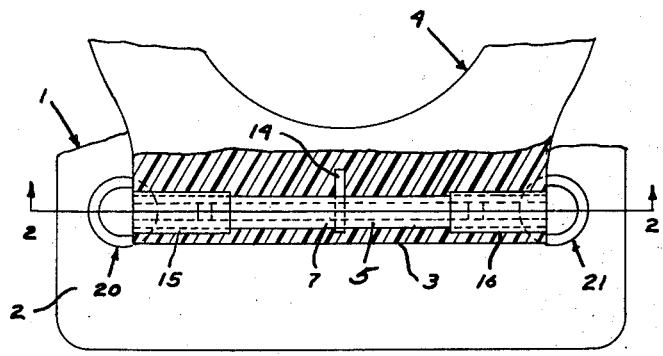
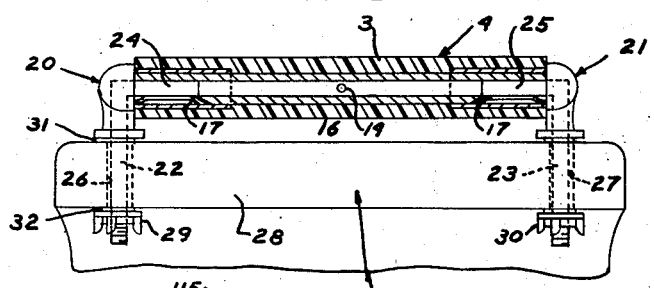
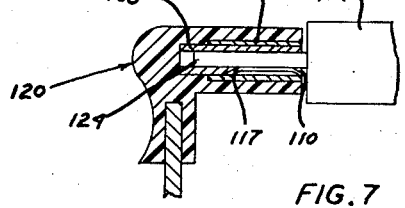
INVENTOR.
SHERWOOD L. YOUNG
BY
Andrew K. Foulke
HIS ATTORNEY

United States Patent Office 2,787,006
Patented Apr. 2, 1957

2,787,006

FRICTION HINGE

Sherwood L. Young, Monson, Mass., assignor, by mesne assignments, to American Radiator & Standard Sanitary Corporation, New York, N. Y., a corporation of Delaware Application July 20, 1953, Serial No. 368,894

1 Claim. (Cl. 4—240)

This invention relates to new and useful improvements in hinges, and more particularly to a hinge for a closet seat having a friction means therein operable to hold the seat and hinge in a predetermined position.

In the development of the plumbing industry, and particularly in the art of water closets and seats therefor, there has evolved a hinge arrangement which is used throughout most of the industry. In this arrangement the seat is provided with a cylindrical aperture extending through the base portion thereof or a pair of cylindrical recesses at opposite sides thereof into which are fitted the pintles of a pair of hinge post members. By using a hinge construction of this type, a closet seat may be used with water closets manufactured by different manufacturers and having apertures for the supporting hinge posts at different distances from each other. There has developed a certain demand for a closet seat having some means for retarding movement of the seat to prevent it from falling with great force on the rim of the closet bowl.

It is therefore one object of this invention to provide a new and improved hinge especially adapted for use with closet seats which includes a means for frictionally retarding movement of the seat.

Another object is to provide a new and improved hinge for closet seats of the removable post type and including a frictional means retarding movement of the seat.

Another object is to provide a new and improved friction hinge for closet seats which uses the standard supporting post and which has a friction spring member for retarding movement of the seat relative to said supporting post.

Another object is to provide a friction hinge arrangement for a molded closet seat in which the frictional member is supported in an insert member molded integrally with the seat.

Another object is to provide a friction hinge for closet seats which is simply and inexpensively manufactured and assembled.

Other objects will become apparent from time to time throughout the specification and claims as hereinafter related.

This invention comprises the new and improved construction and combination of parts, which will be described more fully hereinafter and the novelty of which will be particularly pointed out and distinctly claimed.

In the accompanying drawings, to be taken as part of this specification, there is clearly and fully illustrated a preferred embodiment of this invention, in which drawings:

Figure 1 is a fragmentary plan view of the rear portion of a water closet and the seat therefor and showing a partial section of the seat to show the location of a cylindrical hinge insert member;

Figure 2 is a sectional view of the closet seat taken along the line 2—2 of Figure 1 but showing a portion of the water closet and the supporting hinge posts in full elevation;

Figure 3 is an enlarged detail view partially in elevation and partially in section of the cylindrical insert member shown in Figure 1;

Figure 4 is a sectional view of the insert member taken on the line 4—4 of Figure 3;

Figure 5 is a detail view in side elevation of the frictional spring member used in this hinge arrangement on substantially the same scale as Figure 3;

Figure 6 is a detail view in the elevation of the frictional spring member shown in Figure 5; and Figure 7 is a detail sectional view showing an alternate form of this hinge in which the relation of the pintle and the hinge aperture are reversed.

Referring to the drawings by numerals of reference, and more particularly to Fig. 1, there is shown a water closet 1 having a rear supporting portion 2 on which there is pivotally supported the rear end portion 3 of a closet seat 4. The closet seat 4 is preferably one which is of a molded construction made of a moldable material such as hard rubber or a thermosetting or thermoplastic material. The rear portion 3 of the seat 4 is provided with an insert member 5 which is molded integrally with the seat and which is shown in detail in Figs. 3 and 4. The insert member 5 comprises a hollow cylinder 6 having a knurled central portion 7 and end portions 8 and 9 provided with longitudinal extending slots 10 and 11, respectively. The knurled central portion 7 of the insert member 6 has a pair of aligned apertures 12 and 13 therein through which extends a rod member 14. The end portions 8 and 9 of the insert member 5 are provided with cylinders 15 and 16, respectively, which cover the slots 10 and 11 and provide a rear wall for said slots. The insert member 5 is molded integrally in the rear portion 3 of the closet seat 4 and is restrained from rotation by the knurling on the central portion 7 and by the rod member 14 which projects laterally therefrom. When the insert member 5 is molded in the rear portion 3 of the closet seat 4, there are provided cylindrical openings at opposite sides of the seat with the slots 10 and 11 being open both to the side wall of the seat and the inner surface of the inner cylinder 6. A pair of friction spring members 17 are provided for the recesses or slots 10 and 11. The spring member 17 has offset end portions 18 and a body portion 19 which has a lateral cylindrical curvature as is shown in Fig. 6. The offset end portions 18 of the spring member 17 are offset by a distance slightly greater than the depth of the slots 10 and 11 in which the spring members are positioned.

The closet seat is supported by a pair of hinge post members 20 and 21, which are of standard construction. The supporting posts 20 and 21 have vertically extending shaft portions 22 and 23 and laterally extending pintles 24 and 25, respectively. The supporting posts 20 and 21 have their supporting shaft portions 22 and 23 extending through apertures 26 and 27 in the flange 28 of the rear supporting portion 2 of the closet seat and are held in place by nuts 29 and 30. The supporting posts are provided with washers 31 and 32 to prevent damage to the closet seat flange. The pintles 24 and 25 of the supporting posts 20 and 21 are inserted into the opposite end portions 8 and 9 of the insert member and compress the spring members 17 which are positioned longitudinally in the slots 10 and 11, respectively. The spring members 17 have their cylindrically curved body portions 19 frictionally and compressively engaging the pintles 24 and 25 to retard movement of the closet seat.

In operation, this hinge arrangement functions the same as any standard removable post type hinge which has a pintle extending into a cylindrical recess on the closet seat and supporting the same for pivotal movement. In this hinge arrangement, however, the frictional springs 17 provide enough frictional force to restrain the closet seat from movement by gravity when placed in any angular position between horizontal and vertical.

In Figure 7 there is shown an alternate form of this hinge in which the relation of the pintle and the hinge aperture are reversed. In this hinge arrangement the supporting post 120 has a cylinder 105 molded therein. The cylinder 105 has a slot 110 at its outer end and has a sleeve cylinder 115 forming the back wall of the slot 110. A friction spring 117 having the same shape as the spring shown in Figs. 5 and 6 is carried in the slot 110. The closet seat 104 has a rod or pintle 124 which fits inside the cylinder 105 and is frictionally engaged by the spring 110. In this hinge arrangement the spring 110 is operable to support the seat in any intermediate position between horizontal and vertical.

Having thus described the invention, what is claimed and is desired to be secured by Letters Patent of the United States is:

A closet seat friction hinge comprising in combination, a closet seat having a molded body portion, a closet bowl having a seat supporting portion, an insert member comprising a cylinder having slots in the ends thereof and a knurled outer wall molded in said body portion, said slots extending parallel to the longitudinal axis of said cylinder, said cylinder having aligned apertures in the walls thereof, a rod member passing through said apertures and extending outwardly therefrom and molded into position with said cylinder to prevent rotation thereof, a pair of cylinders non-rotatably positioned over and secured to the ends of said first named cylinder and molded into position therewith, a pair of leaf springs having offset end portions and a body portion having a cylindrical curvature transverse to the longitudinal axis thereof, each of said springs being positioned in said slots in said first-named cylinder and extending longitudinally thereof, a pair of post members each having a pintle member extending therefrom, said post members being secured to said seat supporting portion with pintle members fitting into opposite ends of said first-named cylinder, said spring end portions being offset a distance greater than the depth of said slots so that said springs will be compressed by said pintle members, and said springs having the curved body portions thereof compressively and frictionally engaging a side portion of said pintle members.

References Cited in the file of this patent

UNITED STATES PATENTS

| | | |
|---|---|---|
| 301,164 | Robson et al. | July 1, 1884 |
| 432,799 | Holland | July 22, 1890 |
| 1,713,935 | Thorsley | May 21, 1929 |
| 1,833,890 | Carmichael | Dec. 1, 1931 |
| 1,967,104 | Sorrow | July 17, 1934 |
| 2,128,187 | Kondrath | Aug. 23, 1938 |
| 2,168,907 | Leslie | Aug. 8, 1939 |
| 2,200,440 | Atwood | May 14, 1940 |
| 2,474,644 | Aitcheson et al. | June 28, 1949 |

FOREIGN PATENTS

| | | |
|---|---|---|
| 383,483 | Great Britain | Nov. 17, 1932 |